United States Patent
Coudray et al.

(10) Patent No.: US 6,309,803 B1
(45) Date of Patent: Oct. 30, 2001

(54) ON-SUBSTRATE CLEAVING OF SOL-GEL WAVEGUIDE

(75) Inventors: Paul Coudray, Beaune (FR); S. Iraj Najafi, Westmount (CA)

(73) Assignees: Lumenon, Innovative Lightwave Technology, Inc., Quebec (CA); Centre National de la Recherche Scientifque, Paris (FR)

( * ) Notice: Subject to any disclaimer, the term of this patent is extended or adjusted under 35 U.S.C. 154(b) by 0 days.

(21) Appl. No.: 09/345,872

(22) Filed: Jul. 1, 1999

(51) Int. Cl.[7] .................. G03F 7/00; G02B 6/10

(52) U.S. Cl. ............... 430/321; 430/394; 430/330; 430/49; 430/88; 430/130

(58) Field of Search .................. 430/394, 321, 430/330; 385/49, 83, 88, 130, 132, 137

(56) References Cited

U.S. PATENT DOCUMENTS

| | | | | |
|---|---|---|---|---|
| 4,966,433 | * | 10/1990 | Blonder et al. | 385/49 |
| 5,080,962 | * | 1/1992 | Hench | 385/49 |
| 5,378,256 | * | 1/1995 | Green et al. | 65/395 |
| 5,854,868 | * | 12/1998 | Yoshimura et al. | 385/49 |
| 5,989,778 | * | 11/1999 | Hozumi | 430/281.1 |
| 6,017,640 | * | 1/2000 | Muthiah et al. | 428/514 |
| 6,054,253 | * | 4/2000 | Fardad et al. | 430/321 |

FOREIGN PATENT DOCUMENTS

| | | | | |
|---|---|---|---|---|
| 60-014206 | * | 1/1985 | (JP) | 385/49 |
| 63-096609 | * | 4/1988 | (JP) | 385/49 |
| 04-343304 | * | 11/1992 | (JP) | 385/49 |
| 05-297244 | * | 11/1993 | (JP) | 385/49 |
| 98/34304 | * | 8/1998 | (WO) | |

OTHER PUBLICATIONS

"Organoaluminophosphate sol–gel silica glass thin films for integrated optics", T. Touam et al, *Thin Solid Films*, vol. 307, pp. 203–207 (1997).

"Sol–Gel Glass Waveguide and Grating on Silicon", S. Iraj Najafi et al., *Jornal of Lightwave Technology*, vol. 16, No. 9, pp. 1640–1646 (1998).

Li, Kewen K., et al., "Self–Aligned Ormosil Waveguide Devices" SPIE 3489, pp. 58–65 (Jul. 1998).*

Najiafi, S.I, et al., "UV light Imprinted Surface, Ridge and Buried Sol–Gel Glass Waveguides and Devices on Silicon", SPIE 2954 pp. 100–104, (1996).*

* cited by examiner

*Primary Examiner*—Martin Angebranndt
(74) *Attorney, Agent, or Firm*—Darby & Darby

(57) ABSTRACT

In the method for on-substrate cleaving of a sol-gel waveguide, a sol-gel buffer layer is produced on a substrate, and a first portion of the sol-gel buffer layer is masked. The second portion of the sol-gel buffer layer is exposed to UV light to make this second buffer layer portion resistant to a given solvent. A sol-gel guide layer is produced on the sol-gel buffer layer after exposure of that second buffer layer portion to UV light. Then the sol-gel guide layer is covered with a mask having an elongated slit opening presenting the general configuration of the waveguide. This elongated slit opening crosses an intersection between the first and second buffer layer portions. The masked sol-gel guide layer is exposed to UV light to form the waveguide in the sol-gel guide layer, exposure to UV light rendering the waveguide resistant to the given solvent. The substrate and the UV exposed sol-gel buffer and guide layers are soaked in the given solvent to dissolve the first buffer layer portion and the sol-gel guide layer around the waveguide whereby the waveguide has a first section adhered to the second buffer layer portion and a second section spaced apart from the substrate due to dissolution of the first buffer layer portion. Finally, the waveguide is cleaved at the above mentioned intersection to form a clean endface of the waveguide.

14 Claims, 4 Drawing Sheets

ON-SUBSTRATE CLEAVING OF SOL-GEL WAVEGUIDE

BACKGROUND OF THE INVENTION

1. Field of the Invention

The present invention relates to a method for on-substrate cleaving sol-gel waveguides.

2. Brief Description of the Pior Art

Cleaving is currently used for producing a clean endface of a channel waveguide in view of optically connecting this channel waveguide to an optical fiber.

Cleaving is also used for coupling light from an external source such as an optical fiber, a laser diode, a light-emitting diode, etc. into a channel waveguide.

Cleaving can also be useful in coupling light between two waveguides made on two different substrates.

Cleaving can further be used to create a certain opening along a waveguide for instance to insert another component or material.

OBJECT OF THE INVENTION

An object of the present invention is to provide an efficient method for on-substrate cleaving a waveguide.

SUMMARY OF THE INVENTION

More specifically, in accordance with the present invention, there is provided a method for on-substrate cleaving a sol-gel waveguide, comprising:

producing on a substrate a sol-gel buffer layer defining first and second adjacent buffer layer portions;

masking the first buffer layer portion;

exposing the second buffer layer portion to UV light to make this second buffer layer portion resistant to a given solvent;

producing a sol-gel guide layer on the sol-gel buffer layer after exposure of the second buffer layer portion to UV light;

masking the sol-gel guide layer with a mask having an elongated opening presenting the general configuration of the waveguide, this elongated opening crossing an intersection between the first and second buffer layer portions;

exposing the masked sol-gel guide layer to UV light to form the waveguide in the sol-gel guide layer, exposure to UV light rendering the waveguide resistant to the given solvent;

soaking in the given solvent the substrate and the UV exposed sol-gel buffer and guide layers to dissolve the first buffer layer portion and the sol-gel guide layer around the waveguide whereby said waveguide has a first section adhered to the second buffer layer portion and a second section spaced apart from the substrate due to dissolution of the first suffer layer portion; and cleaving the waveguide at the above mentioned intersection to form a clean endface of the waveguide.

In accordance with preferred embodiments of the present invention:

production of the sol-gel buffer layer comprises:
preparing a sol-gel material by (a) adding 20 g MAPTMS to 1.08 ml HCl and stirring for 45 minutes, (b) adding 7.5 g Zr(OPr)$_4$ to 1.4 ml MAA and stirring for 45 minutes, (c) mixing together the above two constituents (a) and (b), (d) adding to the mixed material obtained in (c) 2.4 ml H$_2$O and stirring for 45 minutes, and (e) in 30 ml of the liquid obtained in (d) adding 0.5 g Irgacure 1800;
producing a thin film of this sol-gel material; and
baking the film of sol-gel material at a temperature of 70° C. for 10 minutes to produce the sol-gel buffer layer;

the second buffer layer portion is exposed to UV light at a wavelength of 365 nm;

production of the sol-gel guide layer comprises:
preparing a sol-gel material by (a) adding 30 g MAPTMS to 1.62 ml HCl and stirring for 45 minutes, (b) adding 22.32 g Zr(OPr)$^4$ to 4.2 ml MAA and stirring for 45 minutes, (c) mixing together the above two constituents (a) and (b), (d) adding to the mixed material obtained in (c) 3.0 ml H$_2$O and stirring for 45 minutes, and (e) in 30 ml of the liquid obtained in (d) adding 0.856 g Irgacure 1800;
producing a thin film of this sol-gel material; and
baking the film of sol-gel material at a temperature of 70° C. for 15 minutes to produce the sol-gel guide layer;

the masked sol-gel guide layer is exposed to UV light at a wavelength of 365 nm; and the substrate and the UV exposed sol-gel buffer and guide layers are soaked in Butanol for a short duration ranging between 30 seconds and 5 minutes.

The objects, advantages and other features of the present invention will become more apparent upon reading of the following non restrictive description of preferred embodiments thereof, given by way of example only with reference to the accompanying drawings.

DETAILED DESCRIPTION OF THE PREFERRED EMBODIMENT

A preferred embodiment of the method for on-substrate cleaving a sol-gel waveguide will now be described.

Step 1

Figure 1:
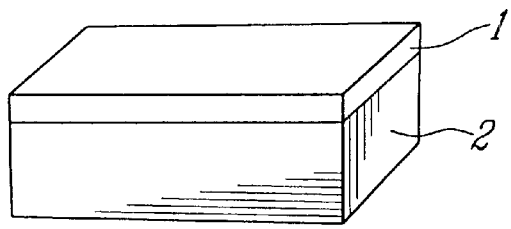
FIG. 1 illustrates a sol-gel buffer layer deposited on a substrate.

As illustrated in FIG. 1, a sol-gel buffer layer 1 is first deposited on a substrate 2.

The substrate 2 is made of silicon and the sol-gel buffer layer 1 is a thin film buffer layer.

The sol-gel material composing the buffer layer is a Zr-polyglass sol-gel prepared as follows by PHASIC (Photonic Hybrid Active Silica Integrated Circuit) process:

a) Add 20 g MAPTMS (3-(trimethoxysilyl) propylmethacrylate) to 1.08 ml HCl and stir for 45 minutes;

b) Add 7.5 g $Zr(OPr)^4$ to 1.4 ml MAA (Methacrylic acid) and stir for 45 minutes;

c) Mix together the above two constituents a) and b);

d) Add to the mixed material obtained in c) 2.4 ml $H_2O$ and stir for 45 minutes; and e) In 30 ml of the liquid obtained in d) add 0.5 g Irgacure 1800 (Irgacure 1800 is a commercially available photolnitiator from the company CIBA).

Step 2

The deposited sol-gel buffer layer 1 is baked at 70° C. for 10 minutes.

Step 3

A contact mask 3 is applied to a first rectangular portion 4 of the sol-gel buffer layer 1. A second rectangular portion 5 of the sol-gel buffer layer 1 remains exposed In the example illustrated in FIG. 2, rectangular layer portion 4 is a first half portion of the sol-gel buffer layer 1 while rectangular layer portion 5 is a second half portion of the sol-gel buffer layer 1. Of course, shapes other than rectangular and proportions other than ½ could be used.

Figures 2, 3:
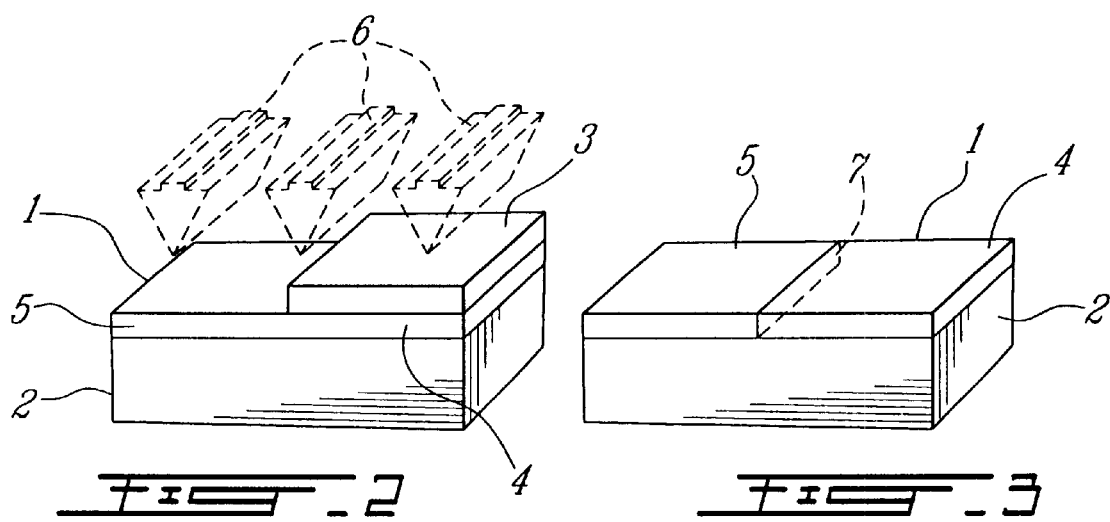
FIG. 2 illustrates a contact mask placed on the sol-gel buffer layer of FIG. 1, and exposure of the masked sol-gel buffer layer to UV (Ultraviolet) light.
FIG. 3 illustrates the sol-gel buffer layer after exposure to UV light.

UV light at a wavelength of 365 nm is generated. This UV light is schematically illustrated in FIG. 2 by three arrows 6. Unprotected layer portion 5 is exposed to the UV light for 60 seconds. The contact mask 3 protecting layer portion 4 against exposure to the UV light is then removed.

Since the photoinitiator used in the above synthesis of sol-gel material is Irgacure 1 800, UV light at a wavelength of 365 nm is FIG. 3 shows an intersection 7 between unexposed layer portion 4 and exposed layer portion 5.

Step 4

Figure 4:
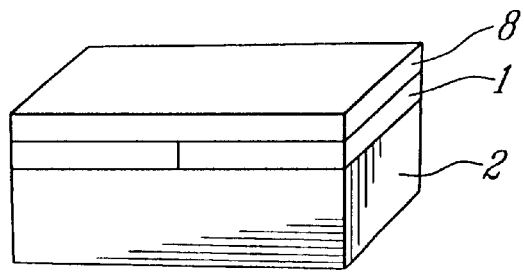
FIG. 4 illustrates a sol-gel guide layer deposited on the UV exposed sol-gel buffer layer of FIG. 3.

As illustrated in FIG. 4, a sol-gel guide layer 8 is deposited on the sol-gel buffer layer 1. This sol-gel guide layer 8 is a thin film guide layer.

The sol-gel material composing the guide layer is a Zr-polyglass sol-gel prepared as follows by PHASIC process;

a) Add 30 g MAPTMS to 1.62 ml HCl and stir for 45 minutes;

b) Add 22.32 g $Zr(OPr)^4$ to 4.2 ml MAA and stir for 45 minutes;

c) Mix together the above two constituents a) and b);

d) Add to the mixed material obtained in c) 3.0 ml $H_2O$ and stir for 45 minutes; and e) In 30 ml of the liquid obtained in d) add 0.855 g Irgacure 1800.

Step 5

The deposited sol-gel guide layer 8 is baked at 70° C. for 15 minutes.

Step 6

Figure 5:
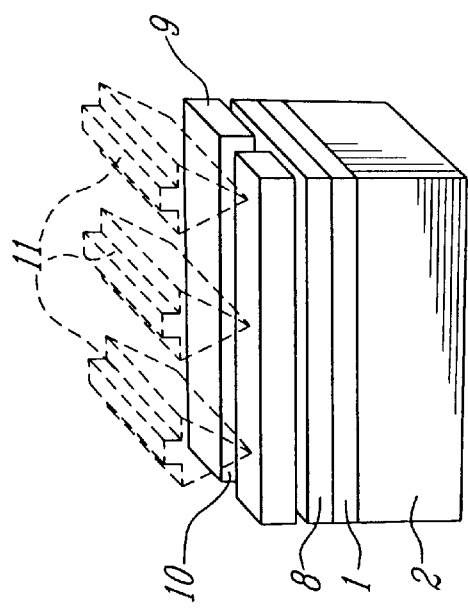
FIG. 5 illustrates a contact mask placed on the sol-gel guide layer of FIG. 4 and exposure of the masked sol-gel guide layer to produce a channel waveguide.

A contact mask 9 is applied to the baked deposited sol-gel guide layer 8. As illustrated in FIG. 5, the contact mask 9 comprises a longitudinal slit opening 10 perpendicular to the intersection 7 between unexposed layer portion 4 and exposed layer portion 5 (see FIG. 3).

Figure 6:
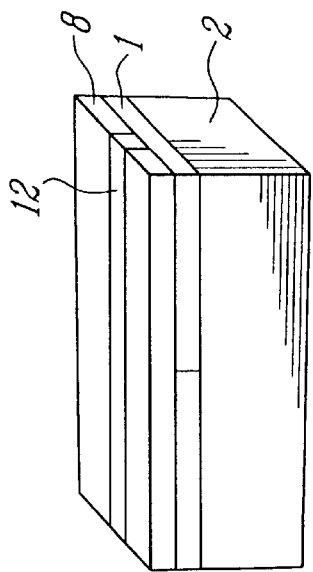
FIG. 6 illustrates the sol-gel guide layer after exposure to UV light.

UV (Ultraviolet) light at a wavelength of 365 nm is generated. This UV light is schematically illustrated in FIG. 5 by three arrows 11. A narrow strip of the sol-gel guide layer 8 Is exposed for 45 seconds to the UV light through the slit opening 10 to form an elongated channel waveguide 12 (FIG. 6) perpendicular to the intersection 7 between non UV exposed layer portion 4 and UV exposed layer portion 5 (see FIG. 3). The contact mask 9 protecting the remainder of the sol-gel guide layer 8 against exposure to the UV light is then removed.

Since the photoinitiator used in the above synthesis of sol-gel material for the guide layer is Irgacure 1800, UV light at a wavelength of 365 nm is used.

Step 7

Those of ordinary skill in the art know that sol-gel material non exposed to UV light dissolves in solvents. Those of ordinary skill in the art also know that exposure to UV light renders such sol-gel material resistant to the same solvents. Accordingly, a solvent can be used to remove the non UV exposed portion of a sol-gel layer while leaving the UV exposed portion of the same sol-gel layer intact.

In this step, the substrate 2 along with the sol-gel buffer layer 1 and the sol-gel guide layer 8 are soaked in a solvent (Butanol) for a short duration ranging between 30 seconds and 5 minutes. Non UV exposed portion 4 (FIG. 3) of the sol-gel buffer layer 1 as well as all the sol-gel guide layer 8 but the channel waveguide 12 dissolve in the solvent. However, UV exposed layer portion 5 and channel waveguide 12 remain intact.

Figure 7:
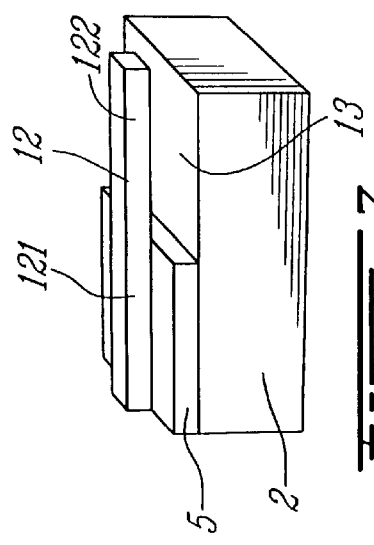
FIG. 7 illustrates the substrate, the sol-gel buffer layer, and the channel waveguide after dissolution of the UV unexposed portions of the sol-gel buffer and guide layers in a suitable solvent.

The resulting product is illustrated in FIG. 7. Only non UV exposed portion 5 of the sol-gel buffer layer 1 remains on the flat surface 13 of the substrate 2. A first section 121 of the channel waveguide 12 is adhered to layer portion 5 while the second section 122 of this channel waveguide 12 is free. More specifically, a spacing exists between the second waveguide portion 122 and the flat surface 13 of the substrate 2. Of course, this spacing has been produced by dissolution of the non UV exposed layer portion 4.

Step 8

Figure 9:
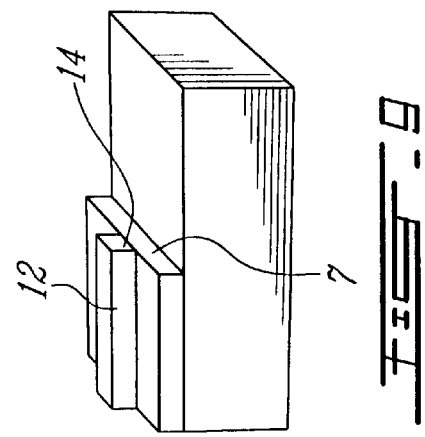
FIG. 9 illustrated the cleaved channel waveguide.
Figure 8:
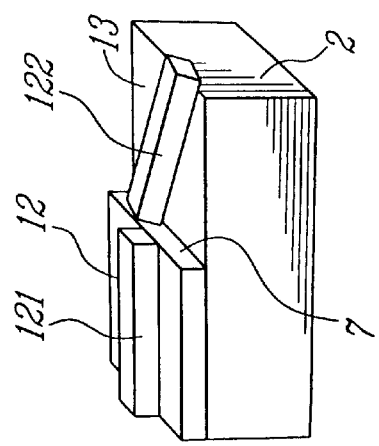
FIG. 8 illustrates on-substrate cleaving of the channel waveguide.
Figure 11:
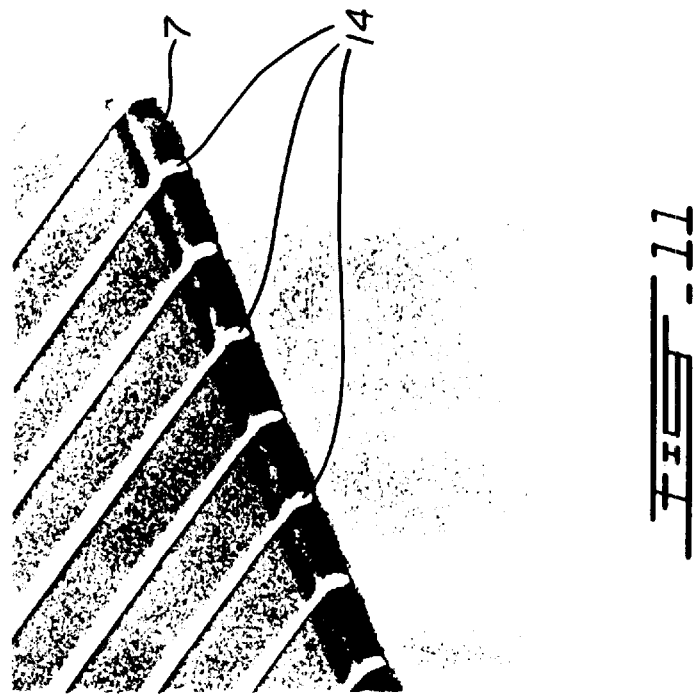
FIG. 11 is a photograph showing a plurality of parallel channel waveguides showing the clean endfaces produced by on-substrate cleaving.
Figure 10:
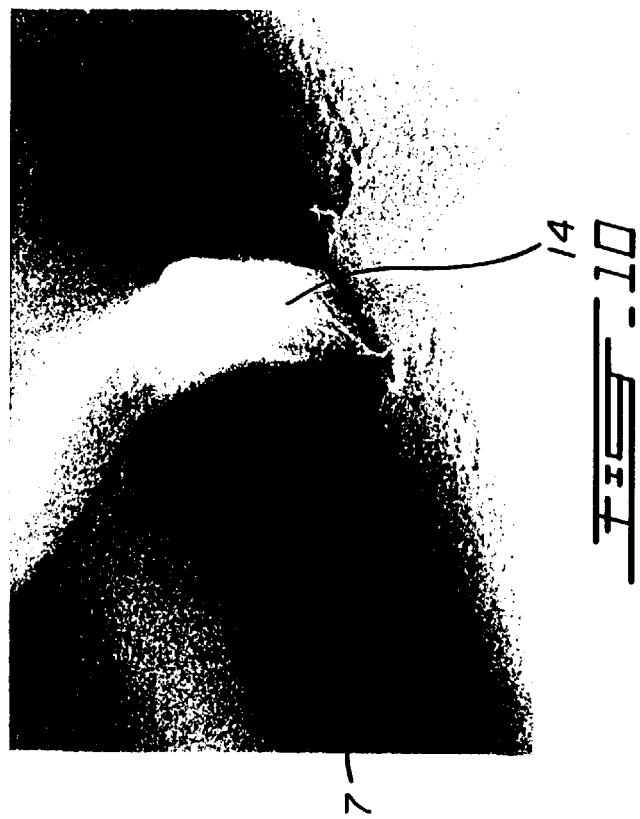
FIG. 10 is a photograph showing the clean end face of the channel waveguide after on-substrate cleaving thereof.

As illustrated in FIG. 8, since a spacing exists between the second waveguide portion 122 and the flat surface 13 of the substrate 2, it is sufficient to apply a pressure on the second waveguide portion 122 toward substrate surface 13 to cleave the channel waveguide 12 at the intersection 7. As illustrated in FIGS. 9, 10 and 11, the channel waveguide 12 cleaves at the interface 7 with a clean endface 14.

In the above described preferred embodiment, the substrate 2 is made of silicon. However, sol-gel waveguides as well as other sol-gel devices can also be manufactured on other optical materials such as compound semiconductors such as GaAs and InP, glass $LiNbO_3$, etc.

The sol-gel buffer 1 and guide 8 layers are preferably thin film layers. However, thick film buffer 1 and guide 8 layers could be contemplated. Techniques such as dip coating, spin coating and any other suitable coating technique could be used to produce the sol-gel buffer 1 and guide 8 layers.

Also, different sol-gel materials can be used to produce the buffer 1 and guide 8 layers. The above described preferred embodiment proposes an example of synthesis of a sol-gel material suitable to make the buffer layer 1, and an example of synthesis of a sol-gel material suitable to make the guide layer 8, produce the channel waveguide 12, and performs on-ubstrate cleaving. As indicated in the foregoing description, these sol-gel materials are Zr-polyglass sol-gel by PHASIC process. Another example of sol-gel material suitable to make sol-gel buffer 1 and guide 8 layers is Al-polyglass, commonly called aluminum-doped sol-gel ([Touam, T et al. "Organoaluminophosphate Sol-Gel Silica Glass Thin Films For Integrated Optics" published in Thin Solid Films, Volume 307, pages 203–207, 1997] and [Najafi, S. Iraj et al. "Sol-Gel Glass Waveguide And Grating On Silicon" published in Journal Of Lightware Technology, Volume 16, pages 1640–1646, 1998]). The use of other syntheses of sol-gel is also within the scope of the present invention.

As Irgacure 1800 is used as photoinitiator in the above described two sol-gel syntheses, the wavelength of the UV light was 365 nm. However, it is within the scope of the present invention to use other wavelengths of UV light when other photoinitiators are used.

Other types of suitable solvents as well as other methods available to those of ordinary skill in the art can be used to dissolve the non UV exposed portions of the sol-gel buffer 1 and guide 8 layers.

There are many applications for on-substrate cleaving of channel waveguides.

Figure 12:
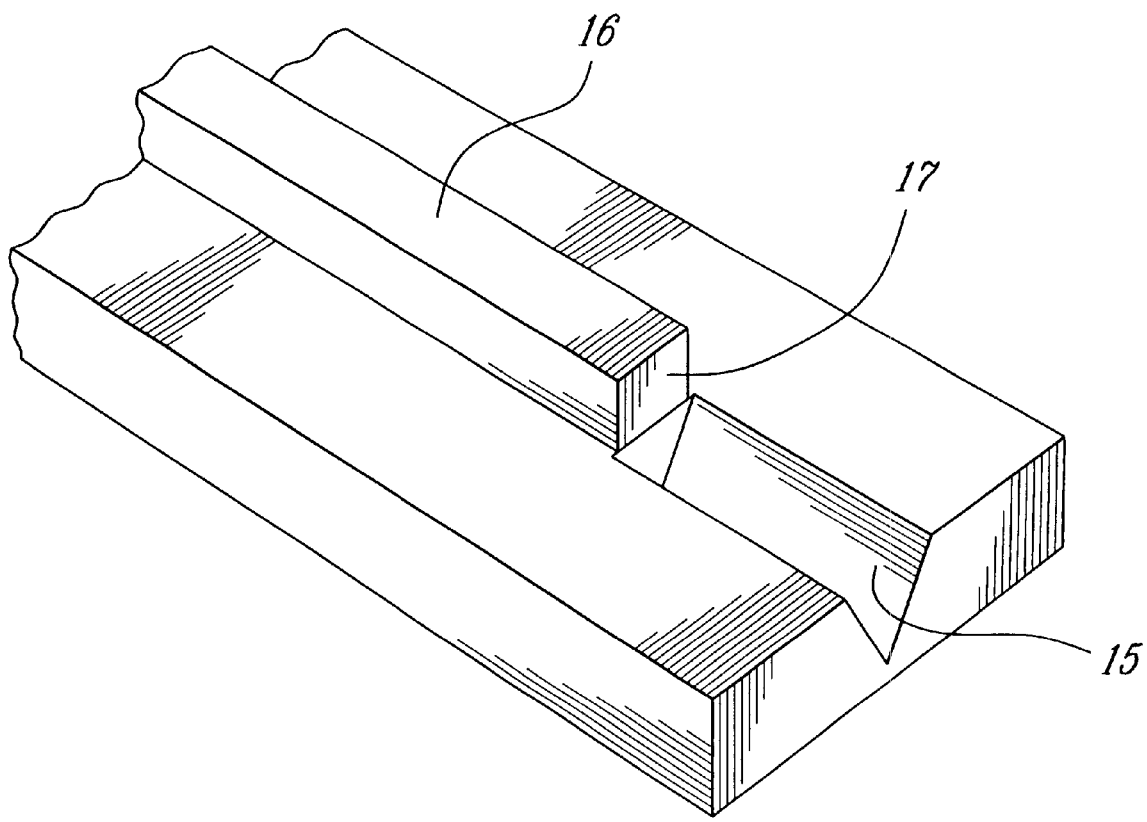
FIG. 12 is a perspective view of a substrate bearing an on-substrate cleaved channel waveguide, showing a method of producing a fiber-to-waveguide connection.

A first example of application is illustrated in FIG. 12. This example is concerned with passive fiber-to-waveguide connection. In this application, a V-groove 15 is made on the substrate prior to waveguide fabrication. The channel waveguide 16 is made and cleaved such that the end face (cleaved face) 17 is located at one end of the V-groove 16. Then an optical fiber (not shown) is simply placed in the V-groove 15 and aligned automatically (passively) with the channel waveguide 16. There is no need for active alignment.

There are many other applications. On-substrate cleaving is useful when we need to couple light from an external source (e.g. an optical fiber, a laser diode, a light-emitting diode) into a channel waveguide. It may also be useful in coupling light between two waveguides made on two different substrates. This process can also be used to create a certain opening along a waveguide for instance to insert some other component or material.

The invention can of course be applied to any type of waveguide manufactured on a substrate.

Although the present invention has been described hereinabove by way of a preferred embodiment thereof, this embodiment can be modified at will, within the scope of the appended claims, without departing from the spirt and nature of the subject invention.

What is claimed is:

1. A method for on-substrate cleaving a sol-gel waveguide for producing a clean waveguide-coupling endface, comprising:

producing a substrate a photosensitive sol-gel buffer layer defining first and second adjacent buffer layer portions;

masking the first buffer layer portion;

exposing the second buffer layer portion to UV light to make said second buffer layer portion resistant to a given solvent;

producing a photosensitive sol-gel guide layer on the photosensitive sol-gel buffer layer after exposure of the second buffer layer portion to UV light;

masking the photosensitive sol-gel guide layer with a mask having an elongated opening presenting the general configuration of the waveguide, said elongated opening crossing an intersection between the first and second buffer layer portions;

exposing the masked photosensitive sol-gel guide layer to UV light to form said waveguide therein, exposure to UV light rendering said waveguide resistant to said given solvent;

removing the unexposed areas of the photosensitive sol-gel buffer layer and the photosensitive sol-gel guide layer by soaking in said given solvent the substrate and the UV exposed sol-gel buffer and guide layers to dissolve the first buffer layer portion and the photosensitive sol-gel guide layer around the waveguide whereby said waveguide has a first section adhered to the second buffer layer portion and a second section spaced apart from the substrate due to dissolution of the first buffer layer portion; and cleaving the waveguide at said intersection to form said clean waveguide-coupling endface.

2. A method for on-substrate cleaving a sol-gel waveguide as recited in claim 1, wherein production of the photosensitive sol-gel buffer layer comprises:

depositing on the substrate the photosensitive sol-gel buffer layer, and baking the deposited photosensitive buffer layer.

3. A method for on-substrate cleaving a sol-gel waveguide as recited in claim 1, wherein production of the photosensitive sol-gel buffer layer comprises:

depositing on the substrate a thin film photosensitive sol-gel buffer layer; and baking and deposited thin film photosensitive sol-gel buffer layer.

4. A method for on-substrate cleaving a sol-gel waveguide as recited in claim 1, wherein production of the photosensitive sol-gel buffer layer comprises preparing a photosensitive sol-gel material by (a) adding 20 g (3-(trimethoxysilyl)propylmethacrylate) to 1.08 ml HCl and stirring for 45 minutes, (b) adding 7.5 g Zr(Opr)$^4$ to 1.4 ml methacrylic acid and stirring for 45 minutes, (c) mixing together the above two constituents (a) and (b), (d) adding to the mixed material obtained in (c) 2.4 ml $H_2O$ and stirring for 45 minutes, and (e) in 30 ml of the liquid obtained in (d) adding 0.5 g Irgacure 1800.

5. A method for on-substrate cleaving a sol-gel waveguide as recited in claim 4, wherein production of the photosensitive sol-gel buffer layer further comprises:

producing a film of said photosensitive sol-gel material; and baking said film of photosensitive sol-gel material at a temperature of 70° C. for 10 minutes to produce the photosensitive sol-gel buffer layer.

6. A method for on-substrate cleaving a sol-gel waveguide as recited in claim 1, wherein exposure of the second photosensitive sol-gel buffer layer portion comprises exposing it to UV light at a wavelength of 365 nm.

7. A method for on-substrate cleaving a sol-gel waveguide as recited in claim 1, wherein production of the photosensitive sol-gel guide layer comprises:

deposition the photosensitive sol-gel guide layer on the photosensitive sol-gel buffer layer; and baking the deposited photosensitive sol-gel guide layer.

8. A method for on-substrate cleaving a sol-gel waveguide as recited in claim 1, wherein production of the photosensitive sol-gel guide layer comprises:

depositing a thin film photosensitive sol-gel guide layer on the photosensitive sol-gel buffer layer; and baking the deposited thin film photosensitive sol-gel guide layer.

9. A method for on-substrate cleaving a sol-gel waveguide as recited in claim 1, wherein production of the photosensitive sol-gel guide layer comprises preparing a photosensitive sol-gel material by (a) adding 30 g (3-(trimethoxysilyl)propylmethacrylate) to 1.62 ml HCl and stirring for 45 minutes, (b) adding 22.32 g $Zr(Opr)^4$ to 4.2 ml methacrylic acid and stirring for 45 minutes, (c) mixing together the above two constituents (a) and (b), (d) adding to the mixed material obtained in (c) 3.0 ml $H_2O$ and stirring for 45 minutes, and (e) in 30 ml of the liquid obtained in (d) adding 0.855 g Irgacure 1800.

10. A method for on-substrate cleaving a sol-gel waveguide as recited in claim 9, wherein production of the photosensitive sol-gel guide layer further comprises:

producing a film of said photosensitive sol-gel material; and baking said film of photosensitive sol-gel material at a temperature of 70° C. for 15 minutes to produce the photosensitive sol-gel guide layer.

11. A method for on-substrate cleaving a sol-gel waveguide as recited in claim 1, wherein exposure of the masked photosensitive sol-gel guide layer comprises exposing it to UV light at a wavelength of 365 nm.

12. A method for on-substrate cleaving a sol-gel waveguide as recited in claim 1, wherein masking the photosensitive sol-gel guide layer comprises masking it with a mask having a slit opening presenting the general configuration of the waveguide.

13. A method for on-substrate cleaving a sol-gel waveguide as recited in claim 1, wherein said soaking comprises soaking the substrate and the UV exposed sol-gel buffer and guide layers in Butanol to dissolve the unexposed portions of the photosensitive sol-gel buffer and guide layers.

14. A method for on-substrate cleaving a sol-gel waveguide as recited in claim 13, wherein said soaking occurs for a short duration ranging between about 30 seconds and about 5 minutes.

* * * * *

UNITED STATES PATENT AND TRADEMARK OFFICE
CERTIFICATE OF CORRECTION

PATENT NO. : 6,309,803 B1  
DATED : October 30, 2001  
INVENTOR(S) : Paul Coundray and S. Iraj Najafi It is certified that error appears in the above-identified patent and that said Letters Patent is hereby corrected as shown below:

<u>Title page,</u>
Item [73], Assignee, change "Scientifque" to -- Scientifique --.

Signed and Sealed this

Thirteenth Day of August, 2002

Attest:

JAMES E. ROGAN
Attesting Officer     Director of the United States Patent and Trademark Office